April 21, 1959      N. P. MILLAR      2,883,624

ELECTRICAL MEASURING INSTRUMENT

Filed Sept. 21, 1956      4 Sheets-Sheet 1

Inventor
Norval P. Millar
by Richard E. Horley
His Attorney

April 21, 1959  N. P. MILLAR  2,883,624
ELECTRICAL MEASURING INSTRUMENT
Filed Sept. 21, 1956  4 Sheets-Sheet 2
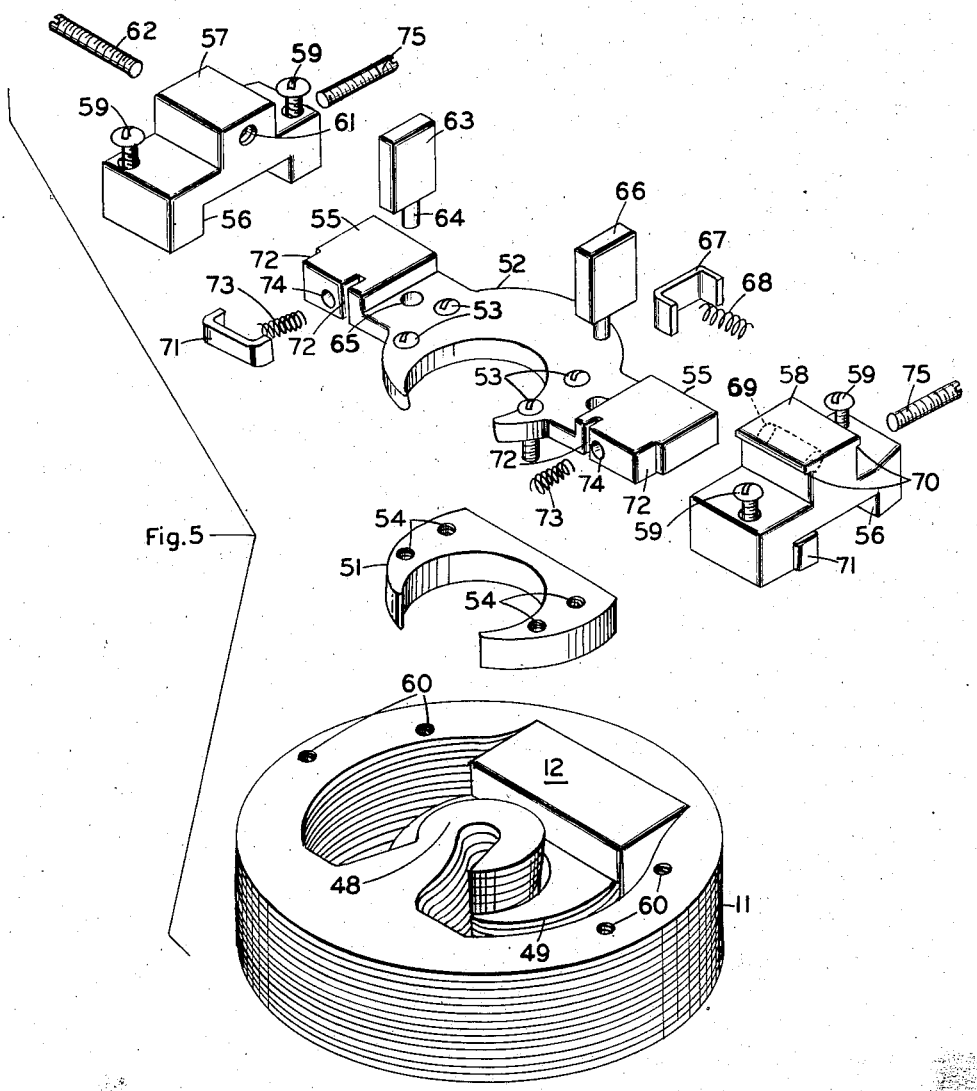
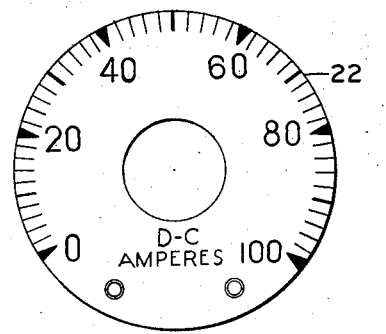
Fig. 4
Inventor:
Norval P. Millar
by Richard E. Hesley
His Attorney April 21, 1959  N. P. MILLAR  2,883,624
ELECTRICAL MEASURING INSTRUMENT
Filed Sept. 21, 1956  4 Sheets-Sheet 3

Inventor:
Norval P. Millar
by Richard E. Horley
His Attorney

April 21, 1959     N. P. MILLAR     2,883,624
ELECTRICAL MEASURING INSTRUMENT

Filed Sept. 21, 1956     4 Sheets-Sheet 4

Inventor:
Norval P. Millar
by Richard E. Hosley
His Attorney

United States Patent Office 2,883,624
Patented Apr. 21, 1959

2,883,624

ELECTRICAL MEASURING INSTRUMENT

Norval P. Millar, Danvers, Mass., assignor to General Electric Company, a corporation of New York Application September 21, 1956, Serial No. 611,233

10 Claims. (Cl. 324—150)

This invention relates generally to improvements in electrical measuring instruments of the moving coil type and in particular relates to improvements in the magnetic field structure thereof.

In the manufacture of electrical measuring instruments, such, for example, as those for measuring direct current volts and amperes, wherein a spring biased coil carrying the current to be measured is arranged for deflection in a substantially fixed magnetic field, an important factor which directly affects both the manufacturing cost and the accuracy of the instrument is the deflection characteristic of the coil throughout the measuring range.

Normally, the magnetic field in such instruments is provided by a magnetic structure having a suitable air gap in which the coil may move against the force exerted by its associated biasing spring and it has been found that non-symmetry and non-uniform magnetic flux density of the field structure, variations in air gap width, mechanical unbalance and improper geometric location of the coil, and non-uniformity in the biasing action of the springs can so affect the deflection characteristic of the coil that it will vary from instrument to instrument during manufacture thereof. Since the deflection of the coil causes an associated pointer to move relative to a fixed scale to thus indicate the magnitude of the electrical quantity being measured, it is quite apparent that a preprinted scale cannot be used without the exercise of extreme care and precision in manufacture, with its attendant high costs. Extremely close tolerances would have to be maintained at each step in the manufacturing process and any effort to reduce costs by lowering tolerances would only result in a number of instruments being produced having scales that do not match the deflection characteristics. Any mis-matched instrument would be inaccurate and the net effect would be to yield batches of instruments having rather large predictable inaccuracies.

Heretofore, it has been a common practice to overcome the aforementioned difficulty by furnishing blank scales with the instruments and hand-marking each scale by individual calibration checks at the completion of manufacturing. Manufacturing tolerances can be less rigid to thereby lower the costs and the resulting non-uniform instrument mechanisms can be utilized by suitable marking of the associated scales.

This method has proved to be acceptable, but the hand-marking is still a costly technique and the resultant batch of instruments would have non-uniform scales. In the case of instruments have a rated accuracy of 1%, which means that the permissible error at any point on the scale cannot exceed 1% of the full scale value of the quantity being measured, there would be a high degree of non-uniformity among the instruments produced. In other words, any group of instruments so produced would have mismatched scales and since such instruments are generally regarded as being much less desirable than those with predetermined identical scales, it is apparent that further improvements are necessary in the design of such instruments.

Therefore, it is a primary object of this invention to provide an electrical measuring instrument of the moving coil type wherein the deflection characteristic of the instrument may be readily and inexpensively matched to a predetermined indicating scale.

It is another object of the invention to provide a magnetic field structure for such an instrument that may be readily and inexpensively adjusted during manufacture to modify the deflection characteristics of the instrument.

It is yet another object of the invention to provide a magnetic field structure for such an instrument that may be readily and inexpensively adjusted during manufacture and subsequent field use to modify the deflection characteristic of the instrument.

In one aspect thereof, the invention comprises an electrical measuring instrument in which a novel magnetic field structure is provided to establish a magnetic flux across an air gap in which portions of a conventional rotatably mounted coil are arranged for deflection. The field structure provides for a completely closed flux path and the air gap is defined by a pair of spaced arcuate pole faces.

One of the pole faces comprises fixed and movable portions, the movable portion being movable relative to the fixed portion to vary the width of a portion of the air gap throughout its length. The movable portion can be adjusted transversely with respect to the air gap in two mutually perpendicular coplanar directions whereby the flux distribution at any point along the gap may be modified to obtain the desired deflection characteristic of the instrument. The movable portion may be readily adjusted during manufacture with the use of simple tools and the arrangement is such that each instrument mechanism produced will have a substantially identical deflection characteristic, thereby permitting the use of a preprinted scale for all instruments produced.

The invention, together with its objects and advantages, will be more clearly understood upon reference to the detailed description set forth below, particularly when taken in conjunction with the drawings annexed hereto, in which:

Figure 4 is a view of an instrument dial which can be used with all embodiments of the invention;

Figure 5 is an exploded view, similar to the view shown in Figure 1, of another form of the invention;

Figure 1:
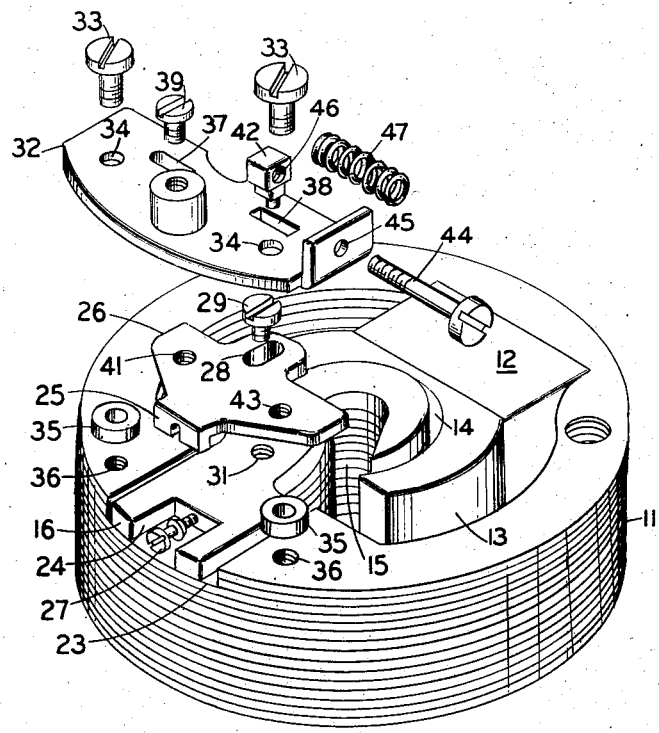
Figure 1 is an exploded view in perspective illustrating one form of the invention.

Referring first to Figure 1, there is shown an exploded view of the magnetic field structure forming a part of an electrical measuring instrument of the moving coil type and it includes a stacked assembly of laminations 11 formed of suitable magnetic material such as soft iron or the like to which may be secured by soldering or other conventional means a permanent magnet 12 formed of Alnico V material or some similar permanent magnet material, the magnet in turn having an arcuate pole piece 13 secured thereto formed of a suitable magnetic material such as soft iron or the like.

Situated within the pole piece 13 and spaced therefrom to define air gap 14 is a hook-shaped core member comprising a fixed portion 15 and a movably mounted portion 16. The fixed portion 15 may be formed as an integral part of a portion of the soft iron laminations 11 and the movable portion 16 may be formed of either solid cold rolled steel stock or of molded powdered iron, both of which have excellent magnetic properties and together with the fixed portion of the hook-shaped core provide a part of the magnetic circuit for the magnetic flux emanating from permanent magnet 12.

Figure 3:
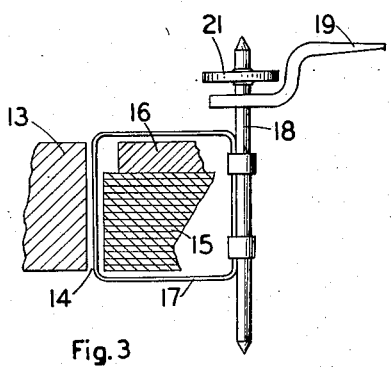
Figure 3 is a partial view, in section, taken along the lines 3—3 in Figure 2, with a coil and pointer assembly added to the arrangement of Figures 1 and 2 to illustrate how it is positioned therein.

The particular magnetic structure disclosed is intended for use in a long scale instrument which may be arranged to measure direct current amperes. The moving coil which cooperates with the magnetic field structure is shown in Figure 3 at 17 and it is seen that it is affixed to a conventional pivotally mounted shaft 18 to which is attached an indicating pointer 19. The conventional biasing spring 21 found in instruments of the moving coil type is shown somewhat diagrammatically and its purpose, of course, is to bias the coil 17 in a zero position and exert a force on the shaft 18 in opposition to the deflection force or torque developed when the current to be measured is flowing in the coil 17.

In Figure 4 there is shown the instrument dial or scale 22 which cooperates with the pointer 19 and it is seen that deflection of the pointer from zero to full scale comprises an angle of approximately 250°. The dial 22 is preprinted and except for some slight crowding near the zero end of the scale, presents a substantially uniform scale throughout the measuring range.

In the mass production of the instrument mechanism so far described it has been found that allowable tolerances compatible with economical low cost manufacturing will permit errors to creep into the performance of the instrument to such an extent that the deflection characteristic of any particular instrument mechanism will not match the preprinted dial. It has been found that the non-symmetrical arrangement of the hook-shaped core which gives rise to non-uniform magnetic flux density of the field structure, together with possible variations in air gap width, mechanical balance, geometrical location of the coil and the biasing characteristic of the biasing spring can all have an influence on the deflection characteristic of the instrument which must be compensated for if the deflection characteristic is to be matched to any particular preprinted dial.

The compensating action required is provided by the movable portion 16 of the hook-shaped core in that it is mounted for motion transversely relative to air gap 14 in two mutually perpendicular coplanar directions. This can be best understood by reference to Figure 2 wherein the direction of motion will be either laterally to the right or left, or vertically up and down, the two directions being thus mutually perpendicular and of course transversely with respect to the air gap 14.

Thus, a portion of the air gap 14 can have its width varied throughout the length of the gap and in this way permit modification or adjustment of the flux distribution at any point along the gap to thereby modify the deflection characteristic of the instrument sufficiently to bring it in line with the deflection characteristic required to match the preprinted dial 21.

To provide for adjustment of the movable portion 16, a portion of the laminations 11 are cut away to form a recess 23 into which the outer end of portion 16 extends. This outer end is slotted to form another recess 24 into which is fitted the down-turned yoke 25 formed on the adjusting plate 26. An adjusting screw 27 threadably engages a suitable aperture in the movable portion 16 and this screw lies in the recess 24 and has its head channeled to cooperate with the slot in yoke 25. The adjusting plate 26 has an elongated slot 28 through which a clamping screw 29 extends into the threaded aperture 31 in movable portion 16.

Figure 2:
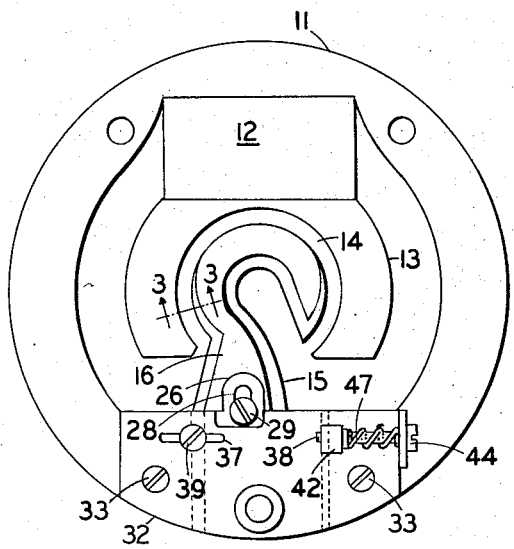
Figure 2 is a top view of the arrangement shown in Figure 1.
Figure 7:
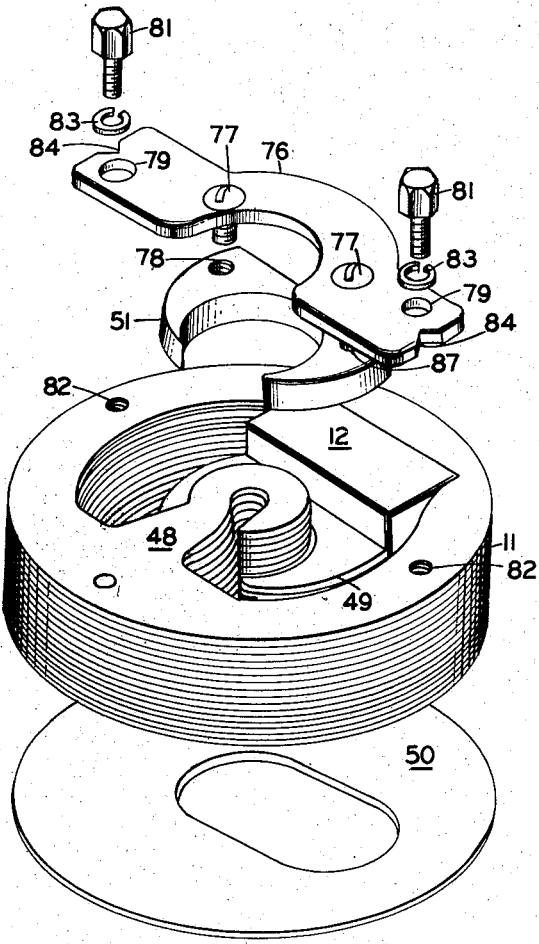
Figure 7 is an exploded view, similar to the views shown in Figures 1 and 5, of still another form of the invention.
Figure 6:
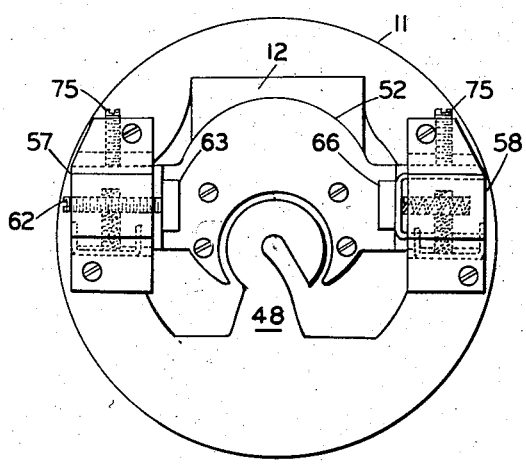
Figure 6 is a top view of the arrangement shown in Figure 5.
Figure 8:
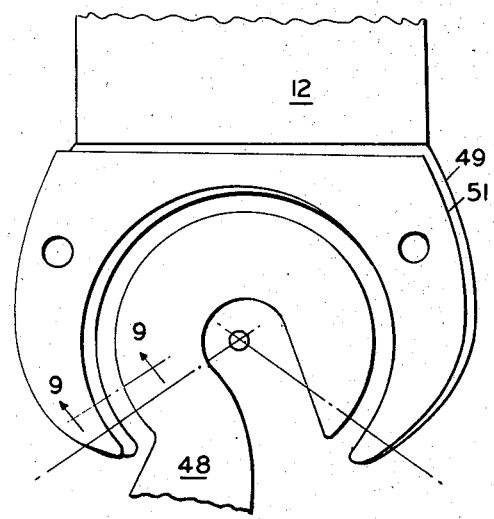
Figure 8 is a partial top view of the arrangement shown in Figure 7 illustrating portions of the field structure and the air gap formed therein.
Figure 9:
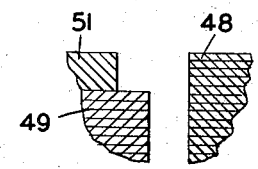
Figure 9 is a partial view, in section, taken along the lines 9—9 of Figure 8.
Figure 10:
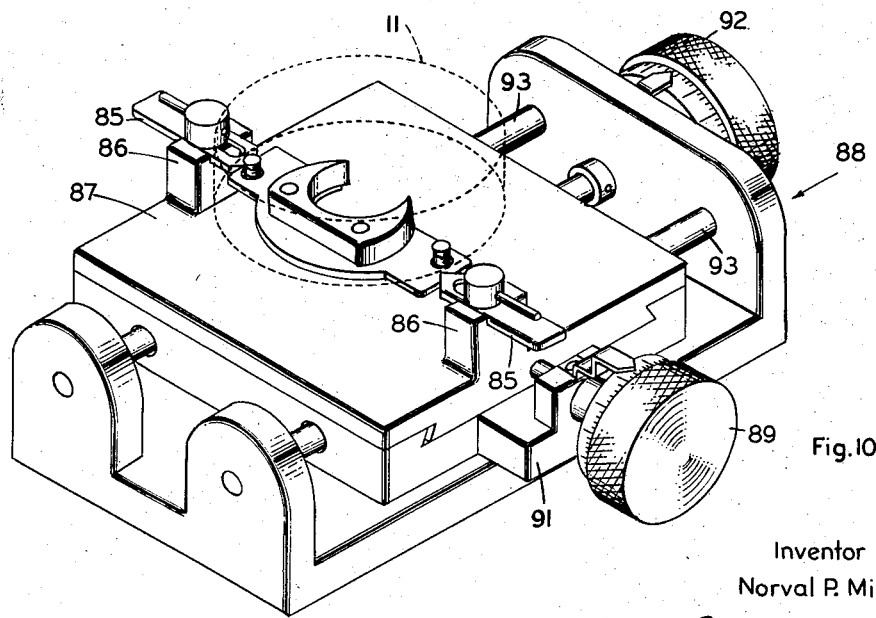
Figure 10 is a view, in perspective, illustrating a simple tool that can be employed to adjust the field structure of the arrangement shown in Figure 7.

With the arrangement described so far, it will be understood that if the plate 26 is fixed and the clamping screw 29 is loosened, adjustment of screw 27 will cause the movable portion 16 to move in a direction perpendicular to the air gap at the midpoint thereof. This direction could be considered the Y coordinate for reference purposes and it will now be seen how motion in a direction along the X coordinate, which is to the right or left, as shown in Figure 2, is accomplished.

A fixed plate 32 is mounted above the adjusting plate 26 and spaced therefrom, being secured to the stacked laminations 11 by means of the screws 33 which extend through apertures 34, spacers 35 and into the threaded apertures 36 provided in the laminations 11. Plate 32 has a pair of elongated slots 37, 38, extending in a direction at right angles to the slot 28, slot 37 being intended to cooperate with a clamping screw 39 which extends through the slot and into the threaded aperture 41 formed in the plate 26. A substantially rectangular laterally adjusting head 42 has a reduced portion extending within the slot 38 and from this reduced portion, there is an end which passes through the aperture 43 provided in plate 26, the head and plate being staked together to form an integral unit.

Cooperating with the lateral head 42 is a lateral adjusting screw 44 which extends through an aperture 45 in the vertical extension of plate 32, the end of the screw engaging a threaded aperture 46 provided in head 42. A spring 47 surrounds the screw 44 to take up any slack between the screw and the parts associated with it.

It will be seen that adjustment of screw 44 with the clamping screw 39 loosened will cause the head 42 to move laterally with respect to the laminations 11 and since this head is staked to the plate 26 which in turn is clamped to the movable portion 16, the desired lateral motion along the X coordinate will be obtained.

The motion in either the X or Y direction is independent, one from the other, and only one direction of adjustment may be utilized, or both as required, to match the deflection of the instrument with the preprinted dial.

The control exercised on the deflection characteristic of the instrument by the movable portion 16 will be readily understood upon reference to Figure 3 which shows a partial sectional view of a portion of the air gap and the associated pole faces formed by the juxtaposed surfaces of the pole piece 13 and the composite hook-shaped core member. Thus, it is readily seen in Figure 3 that the dominant flux distribution in the gap 14, which has a primary influence on the deflection characteristic of the coil 17, is that flux which extends across the gap from the pole piece 13 to the fixed core member 15. It is the dominant flux because the pole face area of the fixed core member 15 is much greater than the pole face area of the movable core member 16.

Moreover, the width of the variable portion of the air gap 14 is never less than the width of the fixed portion of the air gap and in those positions of the movable core member where the width of the variable portion of the gap is greater than the width of the fixed portion of the air gap, there is a reduction in the effectiveness of the flux in its action on the moving coil.

In other words, the moving coil will deflect primarily under the influence of the flux extending between the polepiece and the fixed core member. Superimposed on this flux is the control flux whose magnitude or effectiveness can be modified by changing the position of the movable core member so that the precise deflection at any point on the scale can be controlled within limits. Having the movable core member mounted for adjustment in each of two mutually perpendicular directions provides for simplicity in making any factory adjustments and also permits a substantial degree of flexibility in matching any particular instrument to the preprinted dial. For example, the vertical adjusting screw 27 can be manipulated to match the deflection characteristic of the coil with the intermediate portions of the dial without disturbing the deflection characteristic to any substantial degree in the scale ends. By combining with the vertical adjustment a lateral adjustment, different positions of the coil can be controlled throughout the length of the air gap.

It has been found that the aforementioned arrangement will permit enough adjustment during manufacture to produce a rated accuracy of 1% of full scale at any point along the scale. This accuracy is obtained without moving the movable core member more than 0.025 inch in either the X or Y direction, for it has been found that motion of 0.025 inch solely in the X direction will modify the deflection characteristic by as much as 5% of full scale, whereas motion of 0.025 inch solely in the Y direction will modify the deflection characteristic by as much as 10% of full scale. Thus, the adjustment is quite sensitive in either the X or Y direction, for motion in the X direction of only 0.005 inch yields a 1% control action and motion in the Y direction of only 0.0025 inch yields a 1% control action.

Turning now to Figure 5, there is shown another form of the invention wherein the adjustable magnetic member for controlling the deflection characteristic of the instrument is formed as a part of the pole piece instead of the hook-shaped core, but operates in substantially the same manner as the embodiment shown in Figure 1. Where possible, like numbers will be used to identify like parts and it is seen that the same overall field structure is utilized in the arrangement of Figure 5 and comprises the stacked assembly of soft iron laminations 11, which, in this embodiment, has the entire core 48 formed integral therewith. The permanent magnet 12 is secured to the laminations by soldering or other conventional means and the pole piece is in the form of a two-part assembly. The two parts of the pole piece are movable relative to each other and as in the case of the embodiment of Figure 1, both parts are formed of a suitable magnetic material and along with the core and the laminations make up the complete magnetic circuit for the permanent magnet. The fixed pole piece 49 is secured to magnet 12 by soldering or the like and the movable pole piece 51 rests upon the fixed pole piece and is arranged to be adjustably positioned relative thereto.

As in the embodiment of Figure 1, the movable pole piece 51 may be formed of either solid cold rolled steel stock or of molded powdered iron, either one of which has been found to possess the magnetic properties desired for the instrument mechanism under consideration. Also, the coil arrangement shown in Figure 3 can be used with this embodiment and the dial of Figure 4 may also be used. The only real change involved is in forming the movable control piece of the magnetic structure as a part of the pole piece rather than as a part of the hook-shaped core.

In order to adjust the position of the movable pole piece 51, a crescent shaped plate 52 is secured thereto by means of a plurality of screws 53 which engage the threaded apertures 54 provided in pole piece 51. The plate 52 has its opposite ends in the form of blocks 55 which lie within the rectangular recesses 56 provided in the pedestals 57, 58, each of which is mounted on the laminations 11 by means of the screws 59 which engage the threaded apertures 60 provided in the laminations.

In one of the pedestals there is provided a threaded aperture 61 for receiving the lateral adjusting screw 62 which extends through the aperture to contact the block 63 extending upwardly from plate 52 to which it is rigidly secured. The block 63 has a neck 64 at its lower end which passes through an aperture 65 and the lower end of the neck can be staked to the under surface of the plate to secure the parts together. A block 66 similar to block 63 is also mounted on the plate 52 in a manner similar to the mounting arrangements for block 63 and it is intended to be contacted by the U-shaped member 67 which has its legs extending into a pair of channels 70 in the pedestal 58. A spring 68 lying within a recess 69 formed in pedestal 58 biases the member 67 against the block 66 to thus bias, through the plate 52, the block 63 against the lateral adjusting screw 62. This spring, hence, has the purpose of taking up any slack and maintaining the parts in a substantially fixed position for any position of the screw 62.

It is apparent from the above that any adjustment of the screw 62 will cause the plate 52 to move laterally with respect to the core 48 so that the pole piece 51 attached thereto will be given motion along the X coordinate for purposes of control.

In order to achieve vertical adjustment of the pole piece 51, each of the blocks 55 is provided with the U-shaped caps 71 held on the blocks by the cooperation of their legs lying within the grooves 72 formed in the blocks 55. Similar springs 73 lying within apertures 74 in each of the blocks 55 bias the caps 71 outwardly against the side walls of the recesses 56 to hold the blocks 55 firmly within the recesses. A pair of vertical adjusting screws 75 are provided, one for each of the pedestals, and they extend through suitable threaded apertures provided in each of the pedestals to coact with the ends of the blocks 55 to move the plate 52 in a vertical direction. Thus, the pole piece 51 can have motion along the Y coordinate to achieve control in this direction. For lateral adjustment, the blocks 55 slide in and out of the recesses 56 and such motion has no effect on the setting of the vertical adjusting screw 75. In a like manner, when the screws 75 are manipulated, the blocks 55 will move transversely across the recesses, but this motion will have no effect on the setting of the lateral adjusting screw 62.

Here again, the pole face area defined by the pole piece 51 is much less than the area defined by the pole piece 49. This allows primary control of deflection to be derived from the fixed pole piece and the secondary control, for matching deflection to dial configuration, to be exerted by adjustment of the position of pole piece 51. Also, the width of the air gap determined by the pole piece 51 and the corresponding portions of the hook-shaped core 48 is never less than the width of the air gap determined by the fixed pole piece 49 and the remainder of the hook-shaped core. This arrangement, as in the case of the embodiment of Figure 1, prevents any accidental binding of the moving coil during adjustment of the field structure and at the same time insures that primary control of the deflection characteristic is derived from the flux across the fixed width portion of the air gap.

Referring now to Figures 7, 8, 9 and 10, there is shown a third embodiment of the invention very much like the embodiment of Figure 5 but differing therefrom in that the means for adjusting the position of pole piece 51 are materially simplified and intended primarily for factory adjustment, whereas the embodiments of either Figures 1 or 5 can be adjusted as readily in the factory as in the field when in use.

Here again, the numbers will be used to signify like parts, and it is seen that the laminations 11 have the permanent magnet 12 attached thereto and have the core 48 formed as an integral part thereof. The pole piece has a fixed part 49 and a movable part 51 and the arrangement so far described is in all respects identical to the embodiment of Figure 5. Here again, the coil and the associated dial can be similar to the arrangements described in the embodiment of Figure 1 and the instrument may also be one for measuring direct current amperes.

To position the movable pole piece 51, there is provided a plate 76 rigidly secured to pole piece 51 by means of a pair of screws 77 which engage the tapped apertures 78 formed in the pole piece.

Each of the ends of the plate 76 has an enlarged aperture 79 formed therein through which passes the threaded portion of the clamping screws 81, which engage the threaded apertures 82 formed in the laminations 11. Suitable lock washers 83 are provided for each of the clamping screws and the arrangement is such that the plate 76 can be moved relative to the screws for purposes of adjusting the position of pole piece 51 and when the proper position is attained, the clamping screws 81 can be drawn down onto the plate 76 to hold it firmly in place at all times.

In order to adjust the plate 76, its ends are provided with V-shaped notches 84 which are intended to cooperate with the V-shaped locking members 85 mounted on the pedestals 86 which in turn are formed integrally with a platform 87 forming a part of a simple tool 88 used to position the plate 76 during manufacture of the instruments. The tool 88 can take a variety of forms and its construction has no relation to the invention in question, except that it must provide access to the screws 81 and be capable of holding the plate 76 and moving it in both the X and Y directions to achieve control of the deflection characteristic. For motion in the X direction the platform 87 may be moved by turning the knob 89. This moves the platform 87 relative to the lower platform 91, the parts being dove-tailed together as shown. Of course, when the tool 88 is used, the instrument mechanism, which is shown in outline form, is adapted to be held in a suitable stationary fixture so that the pole piece 51 can be moved as desired.

To achieve motion of the piece 51 in a vertical direction or along the Y axis, the knob 92 may be adjusted and this will move the lower platform 91 back and forth along the guide rods 93. Here again, adjustment of the position of the piece 51 can be limited to one direction without affecting the setting in the other direction, or it can be adjusted in both directions as required. The adjusting knobs may be constructed like micrometers to allow for very precise and sensitive control action.

When using such a tool, a pole piece 51 is first assembled to the instrument mechanism and the screws 81 are tightened slightly to hold it on the laminations 11. The instrument is placed on the tool and after adjustment is completed, the operator may insert a suitable tool in the space underneath and draw them down tightly on the plate to clamp the pole piece in its final position, after which it will not deviate therefrom.

As in the case of the two embodiments previously described, the pole face area of pole piece 51 is much less than the fixed pole piece 49 and this allows the primary deflection to be determined by the flux extending across the fixed portion of the air gap. The secondary influence on deflection can thus be modified by changing the position of the pole piece 51 at any point along the scale.

The width of the adjustable portion of the air gap is never less than the width of the fixed portion of the air gap, for reasons heretofore discussed in connection with the embodiments of Figures 1 and 5.

From the above, it is seen that the deflection characteristic of either of the three embodiments can be readily and easily modified during manufacture of the instruments and where adjustment in the field is required, the embodiments of Figures 1 or 5 can be selected. All of the arrangements have the same sensitivity in control, and the simplest arrangement is that shown in Figure 7 and is, for all practical purposes, the preferred arrangement, for in most instances field adjustment is unnecessary if an accurate adjustment can be readily and inexpensively made during manufacture and is such that it will retain its position during subsequent use.

It is also worthy of note that although a direct current ammeter has been selected to illustrate the principle of the invention, the invention has application to other electrical quantities, both direct current and alternating current, so long as the mechanism is of the moving coil type and utilizes a field structure similar to that disclosed.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, and means for varying the width of said second portion of said gap including a magnetic member having an arcuate portion extending throughout the length of said gap and forming with an arcuate portion of said field structure one of said pole faces, said cooperating arcuate portions being movable relative to each other transversely of said gap in two mutually perpendicular coplanar directions.

2. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, said variable width being never less than said fixed width, and means for varying the width of said second portion of said gap including a magnetic member having an arcuate portion extending throughout the length of said gap and forming with an arcuate portion of said field structure one of said pole faces, said cooperating arcuate portions being movable relative to each other transversely of said gap in two mutually perpendicular coplanar directions.

3. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, and means for varying the width of said second portion of said gap including a magnetic member having an arcuate portion extending throughout the length of said gap and forming with an arcuate portion of said field structure one of said pole faces, said arcuate portion of said field structure defining a pole face area greater than the pole face area defined by the arcuate portion of said magnetic member, said cooperating arcuate portions being movable relative to each other transversely of said gap in two mutually perpendicular coplanar directions.

4. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, and means for varying the width of said second portion of said gap including a magnetic member having an arcuate portion extending throughout the length of said gap and forming with an arcuate portion of said field structure one of said pole faces, said cooperating arcuate portions being movable relative to each other transversely of said gap in two mutually perpendicular coplanar directions, one of said directions being radially across said gap at the midpoint thereof.

5. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, said variable width being never less than said fixed width, and means for varying the width of said second portion of said gap including a magnetic member having an arcuate portion extending throughout the length of said gap and forming with an arcuate portion of said field structure one of said pole faces, said arcuate portion of said field structure defining a pole face area greater than the pole face area defined by the arcuate portion of said magnetic member, said cooperating arcuate portions being movable relative to each other transversely of said gap in two mutually perpendicular coplanar directions.

6. In an electrical measuring instrument of the moving coil type, magnetic field structure for establishing a closed flux path therein, said structure including a pair of spaced pole faces defining an arcuate air gap in which said coil may move, a first portion of said gap having a width that is fixed throughout the length of said gap, a second portion of said gap having a width that may be varied throughout the length of said gap, said variable width being never less than said fixed width, and means for varying the width of said second portion of said gap including a magnetic member having an arcuate portion extending throughout the length of said gap and forming with an arcuate portion of said field structure one of said pole faces, said arcuate portion of said field structure defining a pole face area greater than the pole face area defined by the arcuate portion of said magnetic member, said cooperating arcuate portions being movable relative to each other transversely of said gap in two mutually perpendicular coplanar directions, one of said directions being radially across said gap at the midpoint thereof.

7. In an electrical measuring instrument of the moving coil type, magnetic field structure for establishing a closed flux path therein, said structure including a pair of spaced pole faces defining an arcuate air gap in which said coil may move, said gap subtending an angle of 250°, a first portion of said gap having a width that is fixed throughout the length of said gap, a second portion of said gap having a width that may be varied throughout the length of said gap, said variable width being never less than said fixed width, means for varying the width of said second portion of said gap comprising a magnetic member having an arcuate portion extending throughout the length of said gap and forming with an arcuate portion of said field structure one of said pole faces, said arcuate portion of said field structure defining a pole face area greater than the pole face area defined by the arcuate portion of said magnetic member, said arcuate portion of said magnetic member being movable transversely of said gap in two mutually perpendicular coplanar directions, and means mounted on said field structure for moving said magnetic member.

8. In an electrical measuring instrument of the moving coil type, magnetic field structure for establishing a closed flux path therein, said structure including an arcuate core member and an arcuate pole member, said last named members being spaced apart to form an air gap therebetween, each of said spaced apart members having arcuate pole faces situated on opposite sides of said gap thereby defining an arcuate air gap in which said coil may move, said coil being looped around said core, a first portion of said gap having a width that is fixed throughout the length of said gap, a second portion of said gap having a width that may be varied throughout the length of said gap, said variable width being never less than said fixed width, and means for varying the width of said second portion of said gap including a portion of said core member which extends throughout the length of said gap and forms with the remainder of said core member one of said arcuate pole faces, the pole face area of said core portion being smaller than the pole face area of said core remainder, said core portion being movably mounted whereby it may be moved transversely of said gap in two mutually perpendicular directions.

9. In an electrical measuring instrument of the moving coil type, magnetic field structure for establishing a closed flux path therein, said structure including an arcuate core member and an arcuate pole member, said last named members being spaced apart to form an air gap therebetween, each of said spaced apart members having arcuate pole faces situated on opposite sides of said gap thereby defining an arcuate air gap in which said coil may move, said coil being looped around said core, a first portion of said gap having a width that is fixed throughout the length of said gap, a second portion of said gap having a width that may be varied throughout the length of said gap, said variable width being never less than said fixed width, and means for varying the width of said second portion of said gap including a portion of said pole member which extends throughout the length of said gap and forms with the remainder of said pole member one of said arcuate pole faces, the pole face area of said pole portion being smaller than the pole face area of said pole remainder, said pole portion being movably mounted whereby it may be moved transversely of said gap in two mutually perpendicular directions.

10. The combination defined by claim 9 wherein said movable pole portion is carried by an auxiliary supporting member, said auxiliary supporting member being positionable on said field structure during manufacture of said instrument and having means adapted to cooperate with an external adjustable holding fixture whereby said auxiliary supporting member can be moved to properly position said movable pole portion, and clamping means are provided to hold said auxiliary supporting member rigidly in place on said field structure after said movable pole portion has been positioned.

References Cited in the file of this patent
UNITED STATES PATENTS

| | | |
|---|---|---|
| 627,908 | Davis | June 27, 1899 |
| 1,952,160 | Faus | Mar. 27, 1934 |
| 2,637,761 | Young | May 5, 1953 |
| 2,773,240 | Young | Dec. 4, 1956 |
| 2,798,200 | Swan | July 2, 1957 |